US008416997B2

(12) United States Patent
Winters et al.

(10) Patent No.: US 8,416,997 B2
(45) Date of Patent: Apr. 9, 2013

(54) METHOD OF PERSON IDENTIFICATION USING SOCIAL CONNECTIONS

(75) Inventors: Dustin L. Winters, Webster, NY (US); Kevin E. Spaulding, Spencerport, NY (US); Andrew C. Gallagher, Fairport, NY (US)

(73) Assignee: Apple Inc., Cupertino, CA (US)

( * ) Notice: Subject to any disclaimer, the term of this patent is extended or adjusted under 35 U.S.C. 154(b) by 600 days.

(21) Appl. No.: 12/694,305

(22) Filed: Jan. 27, 2010

(65) Prior Publication Data

US 2011/0182482 A1 Jul. 28, 2011

(51) Int. Cl.
 *G06K 9/00* (2006.01)
 *G06F 7/00* (2006.01)
 *G06F 17/30* (2006.01)

(52) U.S. Cl. .................... 382/118; 707/709; 707/736

(58) Field of Classification Search .................. None
See application file for complete search history.

(56) References Cited

U.S. PATENT DOCUMENTS

| | | | |
|---|---|---|---|
| 4,975,969 A * | 12/1990 | Tal | 382/116 |
| 6,810,149 B1 | 10/2004 | Squilla et al. | |
| 6,813,395 B1 | 11/2004 | Kinjo | |
| 7,099,510 B2 | 8/2006 | Jones et al. | |
| 7,203,367 B2 | 4/2007 | Shniberg et al. | |
| 7,274,822 B2 | 9/2007 | Zhang et al. | |
| 7,376,276 B2 | 5/2008 | Shniberg et al. | |
| 7,403,642 B2 | 7/2008 | Zhang et al. | |
| 7,551,755 B1 | 6/2009 | Steinberg et al. | |
| 7,574,054 B2 | 8/2009 | Gallagher et al. | |
| 7,590,267 B2 | 9/2009 | Xiao et al. | |
| 7,599,527 B2 | 10/2009 | Shah et al. | |
| 7,788,260 B2 | 8/2010 | Lunt et al. | |
| 2002/0103813 A1 | 8/2002 | Frigon | |
| 2007/0098303 A1 | 5/2007 | Gallagher et al. | |
| 2007/0177805 A1 | 8/2007 | Gallagher | |
| 2007/0239683 A1 | 10/2007 | Gallagher | |
| 2007/0239778 A1 | 10/2007 | Gallagher | |
| 2008/0077595 A1 * | 3/2008 | Leebow | 707/10 |
| 2008/0130960 A1 | 6/2008 | Yagnik | |
| 2009/0046933 A1 | 2/2009 | Gallagher et al. | |
| 2009/0192967 A1 | 7/2009 | Luo et al. | |
| 2009/0252383 A1 | 10/2009 | Adam et al. | |
| 2011/0016150 A1 * | 1/2011 | Engstrom et al. | 707/778 |

OTHER PUBLICATIONS

Stone et al, "Autotagging Facebook: Social Network Context Improves Photo annotation," 2008, Computer Vision and Pattern Recognition Workshops, 2008. CVPRW '08. IEEE Computer Society Conference on, pp. 1-8.*

(Continued)

*Primary Examiner* — Andrew W Johns
*Assistant Examiner* — David F Dunphy
(74) *Attorney, Agent, or Firm* — Wong, Cabello, Lutsch, Rutherford & Brucculeri LLP

(57) ABSTRACT

A method for automatically identifying persons in digital media assets associated with a database of individual user accounts, comprising: providing access to a database of individual user accounts, wherein the database includes connections between the individual user accounts; receiving a digital media asset associated with a first individual user account; analyzing the received digital media asset to detect an unidentified person; designating collections of digital media assets associated with the first individual user account and other connected individual user accounts; training person identifiers for the previously identified persons by analyzing digital media assets containing the previously identified persons; using a processor to identify the detected unidentified person using the trained person identifiers; and associating metadata providing an indication of the one or more identified persons with the received digital media asset.

20 Claims, 12 Drawing Sheets

OTHER PUBLICATIONS

Facebook Marketing Tactics: Photo Tag Spamming on the Rise, www.insidefacebook.com [online], 2008. [retrieved on Aug. 27, 2012]. Retrieved from the Internet: <URL:http://web.archive.org/web/20081218150531/http://www.insidefacebook.com/2008/11/18/facebook-marketing-photo-tag-spamming-on-the-rise/>, pp. 1-2.*

Facebook, www.wikipedia.com [online], 2009. [retrieved on Aug. 27, 2012]. Retrieved from the Internet: <http://web.archive.org/web/20090107215932/http://en.wikipedia.org/wiki/FaceBook>, pp. 1-19.*

Zhang et al., "Efficient Propagation for face annotation in family albums" Proceedings of the 12th ACM International Conference on Multimedia. pp. 716-723, 2004.

Davis et al., "Toward context aware face recognition," Proceedings of the 13th ACM International Conference on Multimedia, pp. 483-486, 2005.

Stone et al., "Autotagging Facebook: social network context improves photo Animation," First IEEE Workshop on Internet Vision, 2008.

T. Cootes, C. Taylor, D. Cooper, and J. Graham, "Active shape models—their training and application," Computer Vision and Image Understanding, vol. 61, pp. 38-59, 1995.

P. N. Belhumeur, J. Hespanha, and D. J. Kriegman, "Eigenfaces vs.fisherfaces: Recognition using class specific linear projection," IEEE Transactions on Pattern Analysis and Machine Intelligence, vol. 19, pp. 711-720, 1997.

* cited by examiner

DATABASE TABLES

TABLE: CONNECTIONS

| CONNECTIONID * | USERID * | USERID |
|---|---|---|
| 1 | USER01 | USER02 |
| 1 | USER02 | USER01 |
| 2 | USER01 | USER03 |
| 2 | USER03 | USER01 |
| 3 | USER01 | USER04 |
| 3 | USER04 | USER01 |
| 4 | USER02 | USER03 |
| 4 | USER03 | USER02 |
| 5 | USER02 | USER05 |
| 5 | USER05 | USER02 |
| 6 | USER03 | USER06 |
| 6 | USER06 | USER03 |
| 7 | USER05 | USER07 |
| 7 | USER07 | USER05 |
| 8 | USER06 | USER08 |
| 8 | USER08 | USER06 |
| 9 | USER06 | USER09 |
| 9 | USER09 | USER06 |

101

TABLE:PHOTOFILES

| PHOTOID * | OWNER | FILENAME |
|---|---|---|
| 1 | USER01 | PHOTOA1.JPG |
| 2 | USER01 | PHOTOA2.JPG |
| 3 | USER02 | PHOTOB1.JPG |
| 4 | USER03 | PHOTOC1.JPG |
| 5 | USER03 | PHOTOC2.JPG |
| 6 | USER03 | PHOTOC3.JPG |
| 7 | USER04 | PHOTOD1.JPG |
| 8 | USER05 | PHOTOE1.JPG |
| 9 | USER06 | PHOTOF1.JPG |
| 10 | USER07 | PHOTOG1.JPG |

102

TABLE:USERS

| USERID * | NAME |
|---|---|
| USER01 | CONNOR |
| USER02 | DYLAN |
| USER03 | MARY |
| USER04 | DANIEL |
| USER05 | PATRICK |
| USER06 | LEE |

103

TABLE:FACES

| PHOTOID * | USERID * | FACECOORDINATES |
|---|---|---|
| 1 | USER02 | 400,300:600,500 |
| 4 | USER01 | 450,400:550,500 |
| 4 | USER06 | 600,500:700,600 |
| 3 | USER03 | 550,600:600,650 |
| 7 | USER04 | 100,100:400,400 |
| 8 | USER02 | 200,200:500,500 |
| 10 | USER05 | 400,500:450,550 |
| 10 | USER07 | 600,500:650,550 |

TABLE: GROUPS
605

| GROUPID* | GROUPNAME |
|---|---|
| 1 | KODAK EMPLOYEES |
| 2 | ROCHESTER NY REGION RESIDENTS |
| 3 | ROCHESTER MECHANICS INSTITUTE ALUMNI |

TABLE: GROUPMEMBERS
606

| GROUPID* | USERID* |
|---|---|
| 1 | USER01 |
| 1 | USER02 |
| 2 | USER01 |
| 2 | USER02 |
| 2 | USER03 |
| 2 | USER04 |
| 3 | USER01 |
| 3 | USER09 |

*FIG. 7A*

METHOD OF PERSON IDENTIFICATION USING SOCIAL CONNECTIONS

REFERENCE TO RELATED APPLICATIONS

Reference is made to commonly assigned, co-pending U.S. Patent Publication No. 2009/0192967 published Jul. 30, 2009, entitled: "Discovering Social Relationships From Personal Photo Collections" by Luo et al., and to commonly assigned, co-pending U.S. Patent Application Publication No. 2010/0106573 published Apr. 29, 2010, entitled: "Action Suggestions Based on Inferred Social Relationships" by Gallagher et al., both of which are incorporated herein by reference.

FIELD OF THE INVENTION

The present invention relates to a method for identifying persons in digital media assets, and more particularly to a method for identifying persons in digital images associated with a database of individual user accounts.

BACKGROUND OF THE INVENTION

Today, through use of digital photography, consumers are able to easily capture and store large collections of personal digital images. These image collections can be stored either locally on a personal computing device or stored on an online photo management service such as Kodak Gallery which maintains digital image collections for a large number of users and allows users to share their digital images with other users via the internet.

As these image collections become large, however, it can be challenging for a user to search for and retrieve specific desired images from among the collection. For example, a user may wish to retrieve digital images containing a specific person. In response to this need, early digital photo management products provided users with tools for "tagging" individual images by entering a text description identifying individuals shown in each image and saving this information as searchable metadata to the image file or in an associated database for the image files. The user could then easily retrieve all images containing one or more of the desired metadata tags. However, in these early implementations, the user was required to browse through each image to manually identify which images contained people, and to then enter the identity of each individual which would then be saved as metadata in the digital image file. A significant disadvantage of this approach is that manual identification of all the individuals appearing in a large digital image collection can be very time consuming.

Squilla, et al. in U.S. Pat. No. 6,810,149 teach an improved method wherein image icons showing, for example, the face of various individuals known to the user are created by the user, and subsequently used to tag images in a user's digital image collection. This visually oriented association method improves the efficiency of the identification process.

More recent image digital photo management products have added face detection algorithms which automatically detect faces in each digital image of a digital image collection. The detected faces are presented to the user so that the user can input the identity of the detected face. For example, the user can input the identity of a detected face by typing the individual's name or by clicking on a predefined image icon associated with the individual.

Even more advanced digital photo management products have added facial recognition algorithms to assist in identifying individuals appearing in a collection of digital images. An example of such a photo management product is shown in U.S. Patent Application Publication 2009/0252383. Such facial recognition algorithms can be used compare the detected faces to faces which have been previously identified. However, facial recognition algorithms can still provide erroneous results, confused by people which have a similar appearance. Current facial recognition algorithms typically assign a probability of a match of a target image to images which are been previously identified based on one or more features of a target face, such as eye spacing, mouth distance, nose distance, cheek bone dimensions, hair color, skin tone, and so on.

Examples of facial recognition techniques can be found in U.S. Pat. Nos. 4,975,969 and 7,599,527. When facial recognition is performed against individuals with similar appearances, facial recognitions algorithms can often return the incorrect individual. For example, current facial recognition algorithms may have difficulty in distinguishes between two individuals who are identical twins. With a large digital image collection, a large number of different individuals can be identified thereby increasing the opportunity for the facial recognition algorithm to return an incorrect result.

In the article "Efficient Propagation for face annotation in family albums" (Proceedings of the 12th ACM International Conference on Multimedia. pp. 716-723, 2004), Zhang et al. teach a method for annotating photographs where a user selects groups of photographs and assigns names to the photographs. The system then propagates the names from a photograph level to a face level by inferring a correspondence between the names and faces. This work is related to that described in U.S. Pat. No. 7,274,822.

In the article "Toward context aware face recognition" (Proceedings of the 13th ACM International Conference on Multimedia, pp. 483-486, 2005), Davis et al. disclose a method for improving face recognition accuracy by incorporating contextual metadata.

U.S. Patent Application Publication 2007/0098303 to Gallagher et al., entitled "Determining a particular person from a collection," discloses using features such as person co-concurrence to identify persons in digital photographs.

U.S. Patent Application Publication 2007/0239683 to Gallagher, entitled "Identifying unique objects in multiple image collections," teaches a method for determining whether two persons identified in separate image collections are the same person using information such as user-provided annotations and connections between the collections.

U.S. Patent Application Publication 2007/0239778 to Gallagher, entitled "Forming connections between image collections," describes a method for establishing connections between image collections by determining similarity scores between the image collections.

In the article "Autotagging Facebook: social network context improves photo Animation" (First IEEE Workshop on Internet Vision, 2008), Stone et al. teach using social network context to improve face recognition by using a conditional random field model.

U.S. Patent Application Publication 2009/0192967 to Luo et al., entitled "Discovering social relationships from personal photo collections," discloses a method for determining social relationships between people by analyzing a collection of images.

U.S. Patent Application Publication 2009/0046933 to Gallagher, entitled "Using photographer identity to classify images," teaches a method for identify persons in a photograph based on the identity of the photographer.

There is a need for an improved process for assisting a user in classifying individuals in a digital image, particularly when such digital image is a part of a large collection of digital images. Furthermore, comparing faces in a large database of images can be time consuming as the number of known faces increases. It is desirable that this recognition execution time be reduced.

SUMMARY OF THE INVENTION

The present invention represents a method for automatically identifying persons in digital media assets associated with a database of individual user accounts, comprising:

providing access to a database of individual user accounts, wherein the database includes connections between the individual user accounts;

receiving a digital media asset associated with a first individual user account;

analyzing the received digital media asset to detect an unidentified person contained in the received digital media asset;

designating collections of digital media assets associated with the first individual user account and other individual user accounts that are connected to the first individual user account, wherein the collections of digital media assets include digital media assets containing previously identified persons;

training person identifiers for the previously identified persons by analyzing the digital media assets containing the previously identified persons included in the designated collections of digital media assets;

using a processor to identify the detected unidentified person using the trained person identifiers; and associating metadata providing an indication of the one or more identified persons with the received digital media asset.

An advantage of the present invention is that it provides improved accuracy in recognizing faces of individual which have a relation to the user. A further advantage of some embodiments of the present invention is that the time required for executing the facial recognition is reduced compared to a system where all faces known to the system are compared.

BRIEF DESCRIPTION OF THE DRAWINGS

FIG. 2A shows a set of example database tables for use with an online photo-management service in accordance with the present invention;

FIG. 7A illustrates tables that can be used to define user groups according to the present invention;

DETAILED DESCRIPTION OF THE INVENTION

Figure 1:
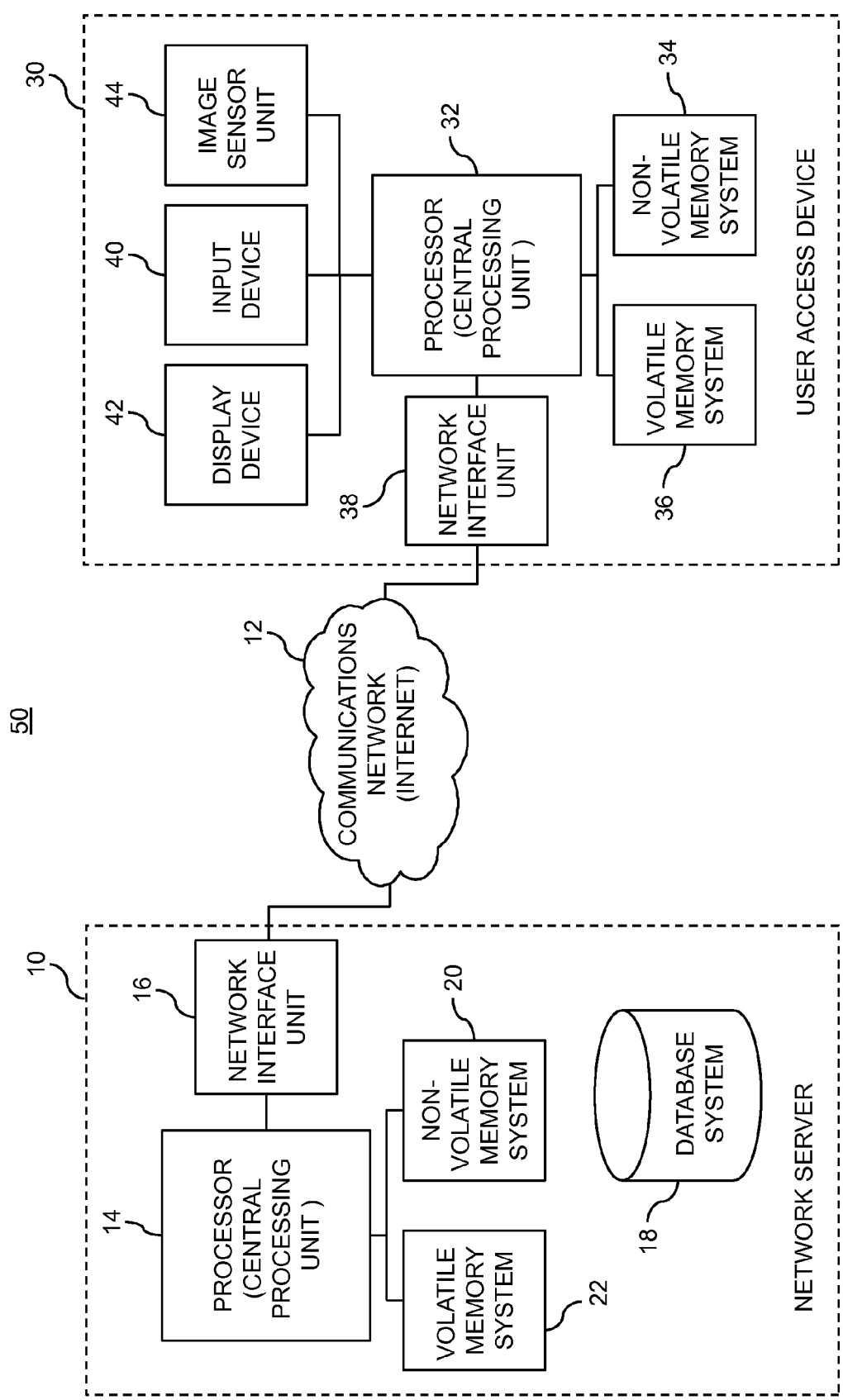
FIG. 1 is a high-level diagram showing the components of a system for identifying persons in digital media assets.

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The present invention relates to digital images. Digital images may be still (non-motion) images. Digital images may also be motion digital images, such as digital videos, which have a plurality of digital image frames. Still and motion digital images are also referred to herein as digital media assets.

The preferred embodiments of the present invention operate as part of, or in connection with, a multi-user online photo-management service. An example of such a photo-management service would include Kodak Gallery. The method of the present invention can also be applied to on-line social network websites such as Facebook and MySpace that allow users to upload and share collections of digital media assets with other users. With these websites, each individual user has an associated internet site that can be linked to internet sites for other users. When users upload digital media assets to their respective internet sites, other users who are "friends" can view the digital media assets. In some cases, the users have the option to manually tag the digital media assets with the identity of persons contained in the digital media assets.

A system diagram illustrating a photo-management service 50 that can be used for implementing the method of the present invention is shown in FIG. 1. In a preferred embodiment, the photo-management service 50 includes at least one network server 10, connected and accessible via a communications network 12. For example, the network server 10 can be accessible over the internet by means of a Uniform Resource Locator (URL). Alternately, the photo-management service 50 can be supplied by way of a personal network or intranet or another private or non-public digital network system such as a cellular telephone network. Alternately, one skilled in the art will recognize that the photo-management service 50 can operate over a distributed collection of servers or file-sharing programs and devices.

In the preferred embodiments, the network server 10 includes a processor 14 (e.g., a central processing unit) for executing instructions and a network interface unit 16 for interfacing with the communications network 12. The network server 10 further includes one or more processor-accessible non-volatile memory systems 20, such as hard disk drives, for storing a plurality of digital images provided by the users, and one or more processor-accessible volatile memory systems 22, such as RAM, for use by the processor 14, the network interface unit 16, or by other system components.

The server also includes a database system 18 for storing information, including a user database for storing user information for a plurality of users, including user access information such as a username and password. The database system 18 further includes one or more image databases for managing the plurality of digital images, together with metadata associated with the digital images. The database system 18 may include information written on the non-volatile memory system 20.

One skilled in the art will understand that the user database and image database could be constructed from a single database or from a plurality of databases. The database(s) could be stored on a single hard drive or multiple hard drives, or could operate on the one or more servers. Preferably the database(s) operate using Structured Query Language (SQL) which is presently available in many commercial products, such as the MySQL software, or the like. Alternately, one skilled in the art can construct the database search and retrieval functionality in custom software and can store the database information in one or more computer files. Such custom data storage and retrieval programs are considered a type of database for purposes of the present invention.

Each user accesses the photo-management service 50 by way of a user access device 30. A wide variety of user access devices 30 that are currently available can be employed for accessing the photo-management service 50, including a personal computer (PC) with a modem or network card, a mobile phone with internet access, a digital camera device with internet access, a digital photo frame with internet access, a video gaming counsel with internet access, a set-top box or digital media player device with internet access, or the like. The user access device 30 preferably includes a processor 32 (e.g., a central processing unit) for executing instructions, a volatile memory system 36 for use by the processor, a network interface unit 38, an input device 40 such as a mouse, a keyboard, a touch screen, a remote control, a pointer device or the like, and a display device 42, for example an LCD screen, or display output connection for outputting to an external display device. The user access device 30 may also optionally include an image sensing unit 44, such as a CMOS or CCD type image sensor array, for capturing digital images as well as a non-volatile memory system 34 such as a flash memory or magnetic hard disk or the like for storing digital image files.

Each user is provided a user account on the photo-management service 50 having an associated user name and password. The user is considered the owner of this account and is provided with privileges to specify account settings for that account. The user is also provided with access to information, such as the digital images, associated with the accounts owned by other users as will be described in further detail below.

Turning now to FIG. 2A, example database tables of the online photo-management service are provided, populated with exemplary data for use in describing the present invention. The database includes a connections table 101 which establishes connections between the users. Connections table 101 includes a field for storing a ConnectionID and a field for storing a UserID, both of which are primary key fields (indicated by the '*' symbol). These connections may represent, for example, an acquaintance or relationship (i.e., brother, spouse, etc.) between the users. Additional fields (not shown) may also be included such as a field describing the specific relationship type between the two users. In the example connections table 101 shown in FIG. 2A, a first user "user01" is connected to a second user "user02" by ConnectionID=1 indicating that user01 is known or somehow related to user02. The connections enumerated in the connections table 101 are hereby defined as "direct connections."

Photo files table 102 associates digital images to corresponding user accounts. The digital images are preferably stored on the server of the online photo-management service. Alternately, the digital images may be stored on a user's access device or another device connected to the network and accessible by the online photo-management service. Each image is assigned a unique "PhotoID," which is a primary key field, and is associated with one of the users using the "Owner" field. The owner of each digital image file constitutes a type of metadata for the image. The exemplary photo files table 102 also includes a "FileName" field giving a filename for the digital image.

A users table 103 contains user account information associating the "UserID" with information about the account owner. In the exemplary users table 103, a "Name" field is provided for storing a real name for the owner of each user account. Additional information (not shown) may also be recorded for each user including password, email address and other personal information.

A faces table 104 contains additional metadata about the digital images stored in the photo files table 102. In particular, the faces table 104 contains an indication of which user(s) have been identified as being depicted in digital images specified by the "PhotoID" filed. A "UserID" field specifies the identity of the identified user. The location in the digital image where the faces of the users appear is stored in the "FaceCoordinates" field, which stores two pairs of (x, y) coordinates corresponding to the upper-left and lower-right corners of a bounding box containing the face. The example coordinates are suitable for a still type digital image. Alternately, in a motion digital image a frame number or frame number range could also be provided. The data in the faces table 102 may be formed by users tagging people in their collections of digital images, for example by manually locating and identifying faces in the digital images, or can be formed using an automatic method such as the method of the present invention.

Figure 2B:
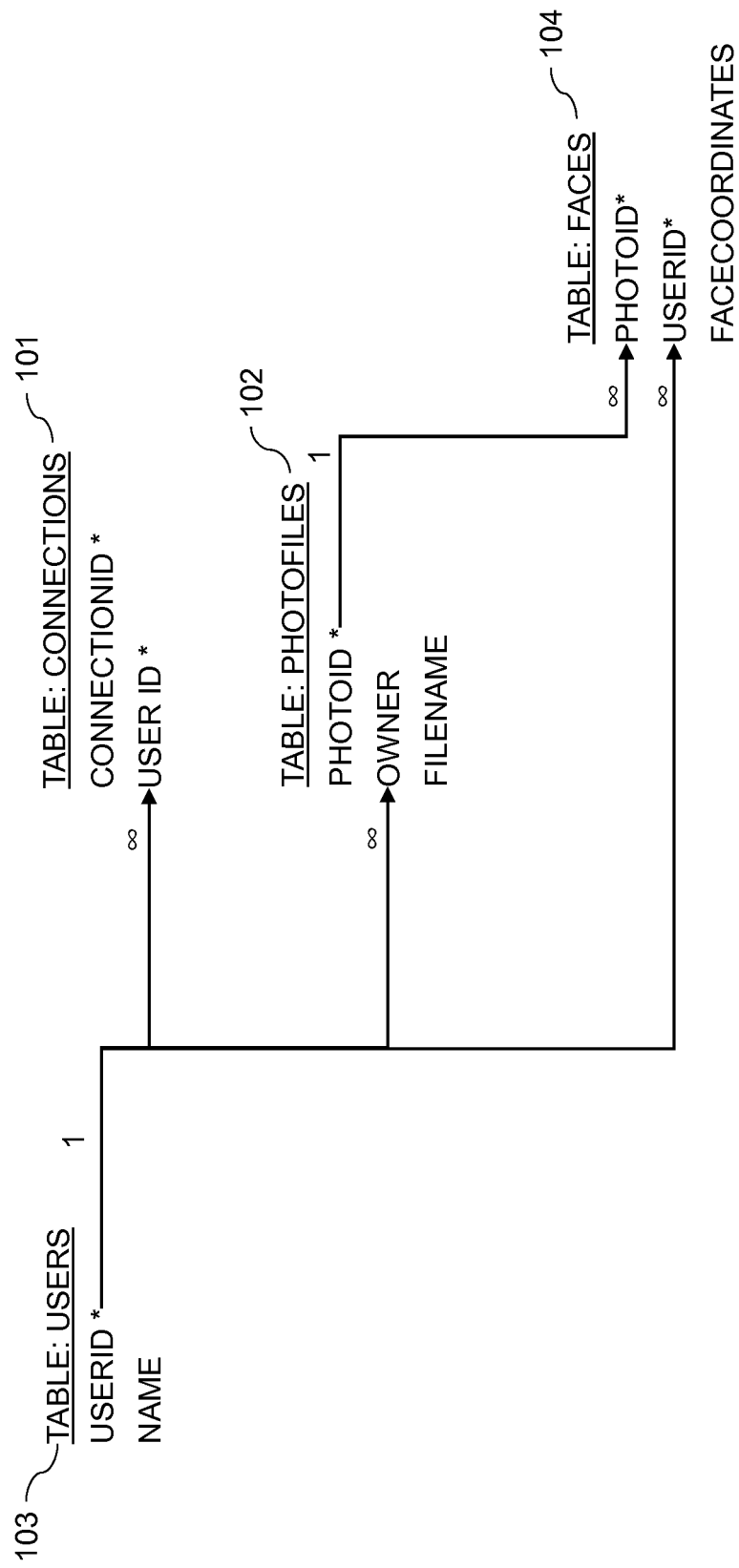
FIG. 2B illustrates the relational structure between the database tables of FIG. 2A.

FIG. 2B illustrates the relational structure between the database tables of FIG. 2A. The "UserID" field of the users table 103 is related in a "1-to-many" relation with the "UserID" field of connections table 101, the "Owner" field of the photo files table 102, and the "UserID" field of the faces table 104. The "PhotoID" field of photo files table 102 is related in a "1-to-many" relation with the "PhotoID" field of the faces table 104.

Figure 3:
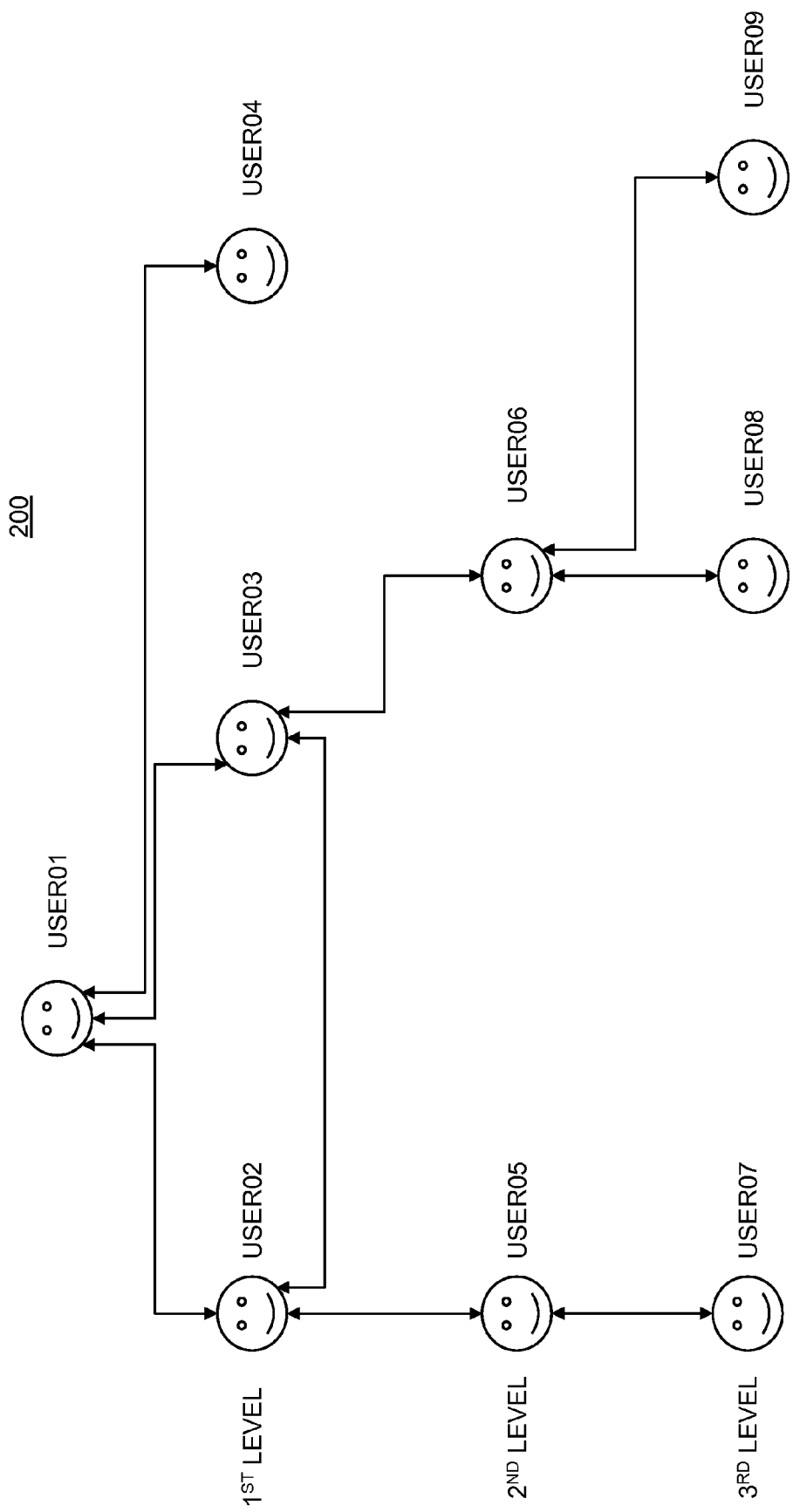
FIG. 3 is a graphic illustration showing a hierarchical connections between the users of FIG. 2A.

Turning now to FIG. 3, a graphic illustration is shown of a hierarchical connections structure 200 relating to user01 based on the exemplary data shown in connections table 101 of FIG. 2A. In this example, user01 is connected to user02, user03, and user04. These directly-connected users are considered to be first-level connections of user01; that is they have a direct connection to user01 as is provided by connections table 101. User05 and user06 are connected to user02 and user03 respectively, but are not directly connected to user01. As such, user05 and user06 are considered to be indirect second-level connections of user01, User07, user08, and user09 are connected to one of the second level users and as such are considered to be indirect third-level connections to user01. Additional connection levels may also be provided such as fourth-level connections, fifth-level connections, sixth-level connections, etc. Second-level and higher connections are herein defined as indirect connections in contrast to the direct connections established by connections table 101 as previously described.

User03 is directly connected to user02, and thereby provides an indirect connection to user01 in addition to the direct connection previously noted. In this case, the direct connection to user01 takes precedent over the indirect connection via user02, such that user user03 is a first level connection to user01, as previously stated. When multiple connection paths can be made between two users, the level of connection is considered to be the minimum number of connection paths between such users.

The hierarchical connection structure 200 shown in FIG. 3 is presented relative to user01. However, analogous hierarchical connection structures can be established and illustrated relative to any of the other users in the database as well. For example, consider a hierarchical connection structure defined relative to user02. In this case, user01, user03, and user05 would be considered first-level connections of user02 while user04, user06, and user07 would be considered second-level connections of user02.

Figure 4:
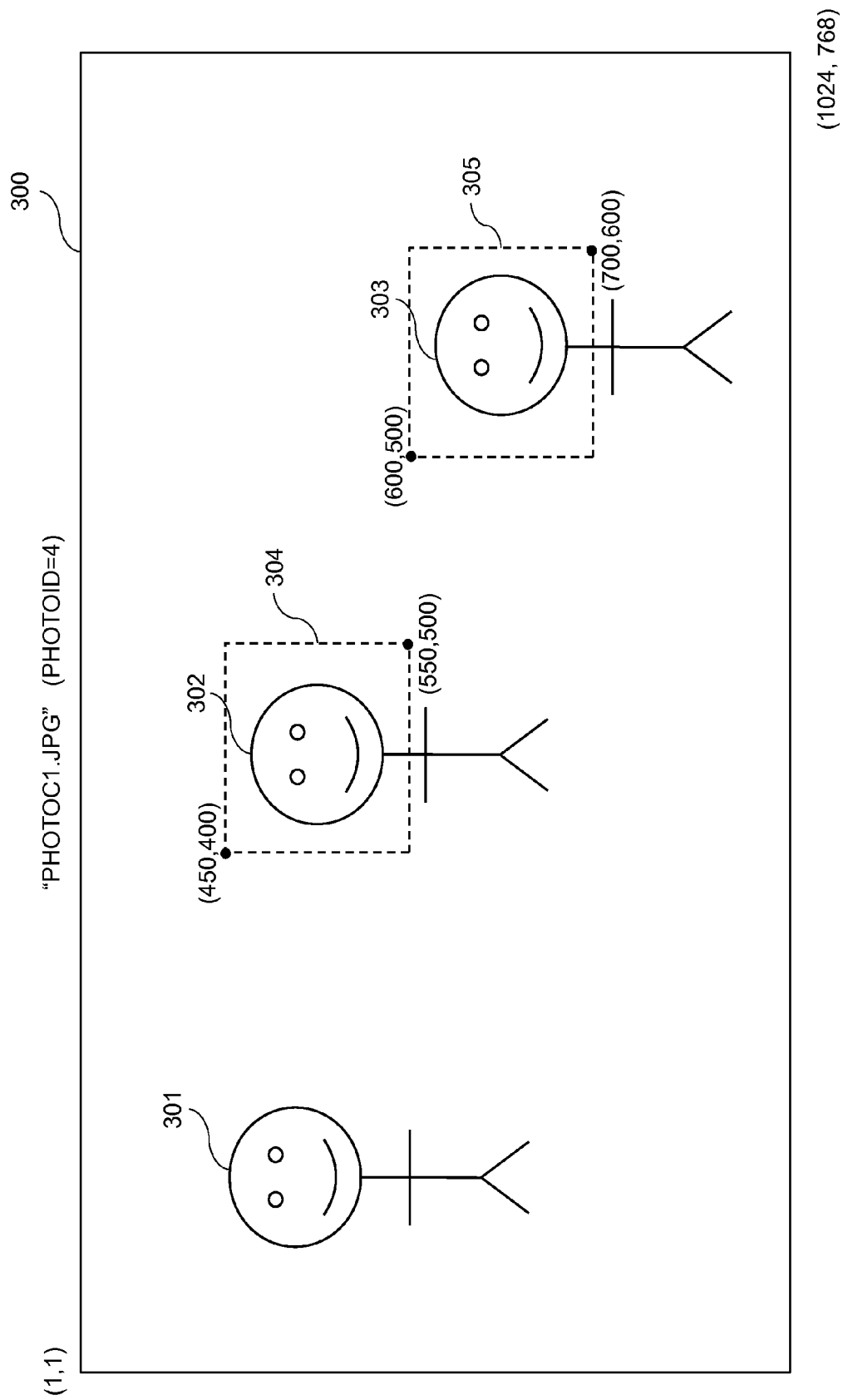
FIG. 4 is an exemplary digital image for use by the photo-management service of the present invention.

Turning now to FIG. 4, an exemplary digital image 300 for use by the photo-management service of the present invention is provided. This exemplary digital image is represented in photo files table 102 of FIG. 2A as PhotoID=4, FileName="PhotoC1.jpg", with Owner=user03. As will be obvious to one skilled in the art, the present invention can utilize images which are compressed or uncompressed and any compressed images may be temporarily uncompressed in order to execute any of the image analysis described below. The digital image 300 is composed of an array of pixels, each specified by an (x,y) coordinate. In this case, the pixels are numbered from (1,1) in the upper left corner to pixels (1024, 768) in the lower right corner. The digital image 300 depicts three pictured individuals 301, 302 and 303. The face of the individual 302 in the middle has been identified as existing in the rectangular region 304 defined by pixels (450,400) to (550,500). As shown in the exemplary data of faces table 104 of FIG. 2A, this face has been associated with user01. The face of the individual 303 on the right has been identified as existing in the rectangular region 305 defined by pixels (600, 500) to (700,600). As shown in the exemplary data of faces table 104 of FIG. 2A, this face has been associated with user06. The face of the individual 301 on the left has not been identified.

Figure 5:
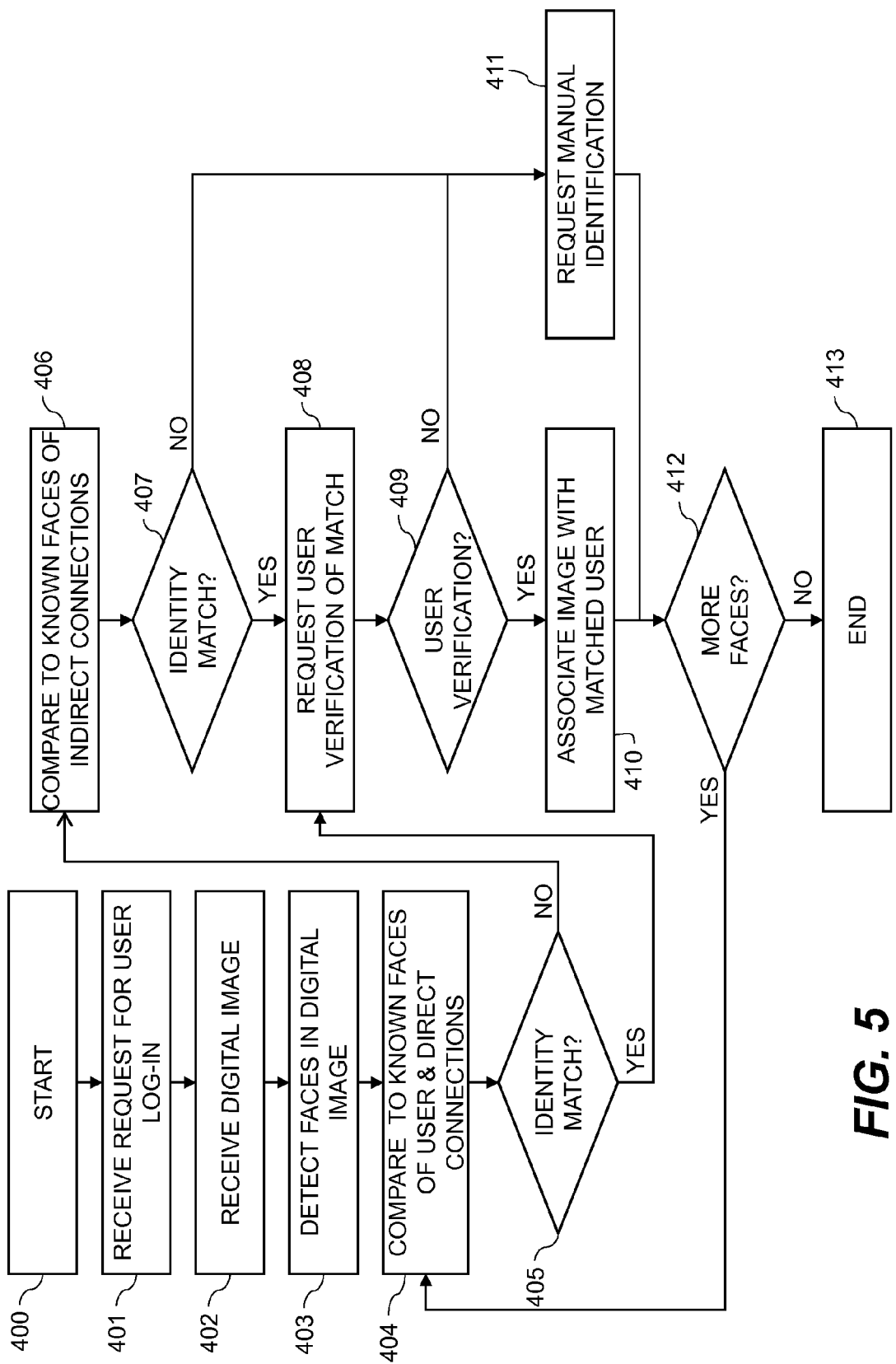
FIG. 5 is a flow chart describing a process for identifying people appearing in a user's digital images according to a first embodiment of the present invention.

Turning now to FIG. 5, a process for identifying people appearing in a user's digital images will be described according to a first embodiment of the present invention. This process may be implemented in software using any known logic based programming language known in the art including C and Java derived programming languages. Alternately, the process of FIG. 5 or any portion thereof may be implemented in digital electronic hardware or a combination of digital electronic hardware and software. Portions of the process may be executed at the user's location on the user's access device, or alternatively at the photo-management service location, for example on the photo-management service's server.

The process of FIG. 5 is initiated with a start step 400. Next, a receive request of user log-in step 401 is executed when a user requests access to the photo-management service and the user is asked for log-in information, including for example a user name and password, for use in connecting to the user's account in the online photo-management service. Once initially received, the log-in information may be stored in user's access device, allowing the user to remain "continuously" logged-in such that the user does not need to be asked for the this information every time the user wishes to perform this operation.

In receive digital image step 402, at least one digital image is received from the user. The user who is providing the digital image is herein referred to as the primary user, and for the examples described herein will be assumed to be "user01" in FIG. 3 and in the exemplary data of FIG. 2A. The receive digital image step 402 also adds the received image to the database as a new record in photo files table 102. Each received digital image is assigned by the database a unique, auto-incremented PhotoID. By default, the user who provided the digital image is also considered the owner of the digital image. In the preferred embodiment, digital images may be uploaded to the online photo-management service, for example in bitmap ".bmp" or JPEG ".jpg" format. Alternately, the digital images may be received and stored on the user's access device. In some cases, the receive digital image step 402 may include the capturing of the digital image by way of a digital image scanner or a digital camera including an image sensor such as a CCD or CMOS based image sensor. The received digital image is now available for analysis in the subsequent steps of the process.

Analysis begins with detect faces step 403 which is performed to detect the presence and location of any faces in the received digital image. In a preferred embodiment of the present invention, a face detection algorithm is used to automatically detect faces. There are many techniques for automatically detecting faces known by those skilled in the art which may be applied to the present invention. One such technique for face detection is described in U.S. Pat. No. 7,099,510. In an alternate embodiment of the present invention, the detect faces step 403 can employ manual face detection by the user, for example by supplying a graphical user interface allowing the user to select a portion, such as a rectangular portion, of the image containing a face.

The number and locations of the detected faces found by the detect faces step 403 are retained, for example in volatile memory, for subsequent use in following steps. If the number of detected faces is zero, the process may be terminated without proceeding. If multiple images are received from the user, a plurality of digital images may be analyzed before proceeding to the next step in the process.

Next, a compare to user and direct connections step 404 is performed wherein a detected face in the received image is compared with previously identified faces associated with the primary user and with other users who are the primary user's first level connections. In the exemplary data provided and illustrated in FIG. 3, this would include the faces identified as user01, user02, user03, and user04. The faces to be used for this comparison are identified in faces table 104 of FIG. 2A. For example, faces which have been identified as user01 include the face identified in the digital image with PhotoID=4 in the region (450,400:550,500). Faces which have been identified as user02 include the face appearing in the digital image with PhotoID=1 in the region (400,300:600, 500) as well as the face appearing in the digital image with PhotoID=8 in the region (200,200:500,500).

There are a variety of techniques known in the art for performing facial recognition comparisons. For example, U.S. Pat. No. 4,975,969, incorporated herein by reference, teaches a technique whereby facial parameters ratios, such as the ratio between the distance between eye retina centers to the distance between the right eye and the mouth center, are measured and compared between two images. Another useful ratio includes the ratio between the distance between the eye retina centers to the distance between the left eye retina and the nose bottom. When using a facial feature ratio comparison technique, it is preferred that a plurality of such ratios is measured. The distances and ratios of the known faces may be calculated at a moment in time when a comparison is being executed by loading the relevant images into memory. Alternately, such distances and/or ratios of the known faces may have been previously calculated, for example at the time the faces were previously identified and stored at that time in the database, for example in another table (not shown) or alternately in another field or fields (not shown) of faces table 104. If multiple known faces of a user are found, the average or median values for the distances or ratios of the faces of that user can be used in comparison to the detected face of the new image.

In decision block 405, the process determines if a match exists between the detected face and any of the previously identified faces of the primary user or the first-level connections of the primary user. When using a facial feature ratio comparison technique, a match is determined if the ratios of the compared face are within an acceptable threshold, for example within 3%. Of course, other thresholds may be used. If multiple matches are found within the threshold, the comparison with the lowest ratio difference is used. If a matching face is identified, no further faces are compared and the process proceeds to a request user verification step 408. As such, no time is consumed in comparing the detected face with faces in the database associated with users having a more distant level connection relative to the primary user.

If no match is found, the process proceeds to a compare to indirect connections step 406 which compares the detected face to previously identified faces of the primary user's indirect connections. In one embodiment of the present invention, the indirect connections are limited to second-level connections. In the exemplary data of FIG. 2B, this includes faces which have been identified with user05 and user06, such as the face of user05 appearing in the digital image with PhotoID=10 in the region of (400,500:450,500) and the face of user06 appearing in the digital image with PhotoID=4 in the region of (600,500:700,600). The same facial comparison techniques as previously described in the compare to user and direct connections step 404 can be applied here.

In alternate embodiments of the present invention, the indirect connections considered in the compare to indirect connections step 406 can include an arbitrary number of connection levels, such as third-level and fourth-level connections. In one embodiment, each more distant connection level is only considered if no matching faces are identified in the closer connection levels. For example, if a match is not detected after comparisons are performed with the primary user's second-level connections, comparisons could then be performed with the primary user's third-level connections, and so on. In yet another alternate embodiment, if no matches are found after checking a pre-defined number of connection levels, the process could perform a comparison against all remaining users which have more distance connections.

In decision block 407, it is determined whether a match exists between the detected face and any of the faces of the primary user's indirect connections. As similarly described relative to decision block 405, when using a facial feature ratio comparison technique, a match is determined if the ratios of the compared face are within an acceptable threshold, for example within 3%. If a match is found, the process proceeds to the request user verification step 408 to request user verification of the match. If no match is found, the process proceeds to a request manual identification step 411 to request manual identification of the face.

In the request user verification step 408, the user is asked to verify that the matched user is in fact the person depicted in the received digital image. One or more of the previously identified faces from the digital images that resulted in the match can be displayed for the user next to the detected face. The response from the user is then passed to decision block 409. If an affirmative response is received, the process proceeds to an associate image with matched user step 410. If a negative response is received, the process proceeds to the request manual identification step 411. The request user verification step 408 is optional. In some embodiments of the present invention, this step can be skipped, particularly if the face detection algorithm indicates that there is a high level of confidence in the identified match.

In the associate image with matched user step 410, the process associates the matched user with the detected face of the received digital image. In one embodiment of the present invention, this is achieved by adding a new record to the faces table 104. The newly assigned PhotoID of the received digital image, as well as the coordinates of the detected face as determined by the detect faces step 403 are recorded in the new record. Also, as previously described, one or more additional fields (not shown in the exemplary faces table 104) may be provided for storing one or more facial feature distance measurements or ratios for use in subsequent comparisons. In an alternate embodiment of the present invention, metadata providing an indication of the identified person(s) is added to the digital file for the digital media asset, for example as EXIF metadata tags.

If no match was found, or if the user rejects the automatically determined match, the process executes the request manual identification step 411. In this step the user is presented with a list of individuals which the user may select for association with the detected face. In one embodiment of the present invention, the list of individuals includes the user together with the user's first level connections. Alternately, the list can include additional more distant connection levels. For cases where the detected face does not correspond to any of the individuals in the list, a user interface can be provided to enable the user to search for the individual in the user database, or to enter a new individual. The user may select an individual for association with the detected face or may elect to not associate any user with the detect face. If the user selects an individual for association with the detected face, this association is recorded in the database in faces table 104 as described above.

In decision block 412, the process may decide to return to the compare to user and direct connections step 404 if addition faces were detected in the received digital images. If no additional faces remain, the process ends at end step 413. In an alternate embodiment, decision block 412 may be executed prior to requesting user verification of the match in request user verification step 408. In this alternate embodiment, the process performs all automatic matches and then simultaneously presents the user with all of the matches together for verification.

In another alternate embodiment, prior to ending the process, an additional step (not shown) may be performed wherein the matched user is notified via the photo-management service that he or she has been identified in a new digital image. The matched user is presented with the digital image and given the opportunity to verify or reject the match. The matched user can reject the match if the match was incorrect, or simply if they do not wish their identity to be associated with the digital image. If the identified user rejects the match, the new metadata record in faces table 104 containing the association to that user is removed.

In yet another alternate embodiment, prior to ending the process, an additional step (not shown) may be performed if the detected face was found to be a second-level or more distant connection. In this alternate embodiment, the process will ask the owner of the digital image whether the matched user is known to him or her. If so, the owner may request via the photo-management services that the matched user be made a direct connection by adding a new record to the connections table 101. The matched user may be also be given an opportunity to accept or reject the connection.

The process described in FIG. 5 has the advantage of automatically detecting individuals which are known to the primary user, while reducing the probability of incorrectly identifying individuals that are only indirectly connected to the user. For example, consider the case where user02 and user05 in FIG. 3, are siblings with similar appearance, or are even identical twins. If the primary user, user01, knows and is directly connected to user02 but does not know and is only indirectly connected to user05, it is more likely that user02 will appear in images received from user01. The described process will preferentially identify user02 over user05 as a match for such images received from user01 as comparisons are first made to the primary user's direct, first-level connections before considering indirect connections.

Figure 6:
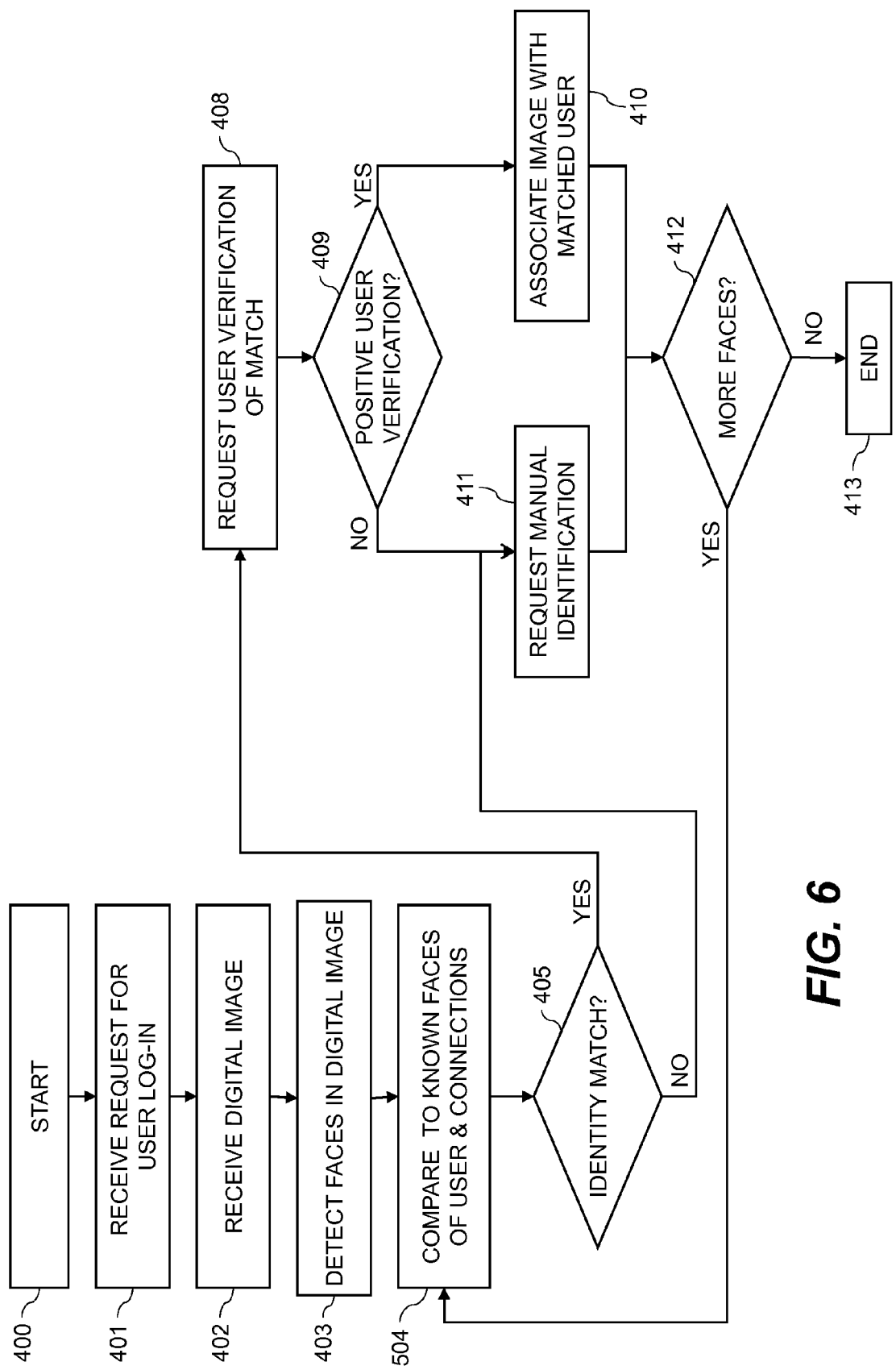
FIG. 6 is a flow chart describing a process for identifying people appearing in a user's digital images according to a second embodiment of the present invention.

Turning now to FIG. 6, a process for identifying people appearing in a user's digital images according to a second embodiment of the present invention will now be described. The exemplary data described and illustrated in FIG. 2A, FIG. 2B, FIG. 3, and FIG. 4 will also be used in describing this second embodiment. As was previously described with respect to the process shown in FIG. 5, this process may be implemented in software using any known logic-based programming language, or alternately in digital electronic hardware or a combination of digital electronic hardware and software. Similarly, it may be executed at the user's location on the user's access device, or at the photo-management service location, for example on the photo-management service's server.

Where steps share the same part numbers with those shown in FIG. 5, these steps are analogous to corresponding steps. Following the detect faces step 403, the process then continues with a compare to user and connections step 504 where the detected face in the received image is compared with faces that have been previously identified with the primary user and with faces identified as users who are connected to the primary user. In this embodiment, the connected users include users that are both directly and indirectly connected to the primary user. The indirectly connected users include the user's first level-connections through X-level connections. In this embodiment, X-level is preferably second-level or third-level connections, but may also be set to a more distant level of connection such as fourth-level, fifth-level, or a more distant connection level.

In the FIG. 3 example, if X-level is set to be the second-level connections, the detected face is compared to faces of the primary user (user01) the primary user's first level connections (user02, user03, and user04), and the primary user's second level connections (user05 and user06). A match score is then calculated for each of the compared users. If X is set to third level connections, third level connections (user07, user08 and user09) would also be included.

The match score relates to the probability or confidence level of a match with that individual, but is not necessarily equal to statistical certainty or probability. For example, using a facial feature ratio comparison technique, the match score may be calculated as using the formula:

$$M = 1 - \left( \sum_{i=1}^{n} \left( \frac{|RatioKnown - RatioUnknown|}{RatioKnown} \right)_i \right) - L \quad (1)$$

Where M is the match score, RatioUnknown is a facial feature ratio (for example the ratio of the eye retina centers to the left eye retina and the nose bottom) for the detected face in the received digital image, RatioKnown is the corresponding facial feature ratio for the face of the user being compared, and L is a weighting factor for the connection level. The relative difference for one or more ratios (from i=1 to i=n, where n≧1 is the number of ratios) is summed. The connection level weighting factor L can be customized and its settings may depend on how many ratios are used in the comparison. Some example values for the weighting factor L for a process where n=5 are:

L=0 for primary user and first-level connections
L=0.01 for second-level connections
L=0.02 for third-level connections
L=0.03 for fourth-level connections
L=0.04 for fifth-level and higher connections If multiple known faces of a user have been previously identified, the average or median values for the distances or ratios of the faces of that user can be used in comparison to the detected face of the new image. By subtracting the connection level weighting factor L as provided above, priority is given to faces of users which are directly connected to the primary user compared to faces of users which are indirectly connected to the primary user.

In an alternate embodiment of the present invention, match scores can be computed using the following equation:

$$M = W \left( 1 - \left( \sum_{i=1}^{n} \left( \frac{|RatioKnown - RatioUnknown|}{RatioKnown} \right)_i \right) \right) \quad (2)$$

where W is a multiplicative connection level weighting factor. Some example values for the weighting factor W for a process where n=5 are:

W=1.0 for primary user and first-level connections

W=0.98 for second-level connections
W=0.96 for third-level connections
W=0.94 for fourth-level connections
W=0.92 for fifth-level and higher connections The set of distances or ratios for the faces of the previously identified users can be considered to be a type of "person identifier." As such, they represent a form of "face print" which can be used to identify a person in much the same way that a fingerprint. Any other type of person identifier known to one skilled in the art can be used to identify the detected person in the received digital media asset. Generally, such person identifiers work by analyzing one or more digital media assets containing a previously identified person to train a person identifier for that individual. The detected unidentified persons can then be identified by processing them using the trained person identifiers. Some types of person identifiers known in the art include other person features besides facial features. For example, body shape and clothing can sometimes provide information useful in the identification of a person.

In decision block 405, it is determined if a match exists between the detected face and one of the known faces. In this case, a threshold may be applied to the match score, whereby if no comparisons result in a match score above the threshold, it is determined that no match is made. An example threshold may be 0.94 for five ratios (n=5). If a match is detected, the process proceeds to request user verification step 408 for user verification, otherwise the process proceeds to request manual identification step 411 to provide the user the opportunity to perform a manual identification.

In the request user verification step 408, a request is sent to the user to verify the match. In one embodiment, the face found to have the highest match score is displayed next to the detected face for comparison. Per decision block 409, if the user rejects the match, the process proceeds to request manual identification step 411 to provide the user the opportunity to perform a manual identification, which is executed similar to the previously described request manual identification step 411 from the first embodiment.

In an alternate embodiment (not shown), if the user rejects the proposed match, the process can provide the compared face having the next lower match score and allow the user to verify that match. In this alternate embodiment, this process can be repeated for progressively lower match scores. In yet another alternate embodiment, the process could present the user with all matches exceeding the threshold in descending order of match score, allowing the user to make an alternate selection as desired.

If the user provides positive verification, the digital image and the matched face is associated with the matched user using an associate image with matched user step 410. This is done by adding a record to faces table 104 as was previously described relative to the associate image with matched user step 410 in the first embodiment. The decision block 412 can then be executed to determine whether additional faces were detected in the digital image(s) which require identification. If no additional faces remain, the process ends at end step 413.

In an alternate embodiment, decision block 412 may be executed prior to requesting user verification of the match in request user verification step 408. In this case, the process performs all automatic matches and then simultaneously presents the user with all of the matches together for verification.

Figure 7B:
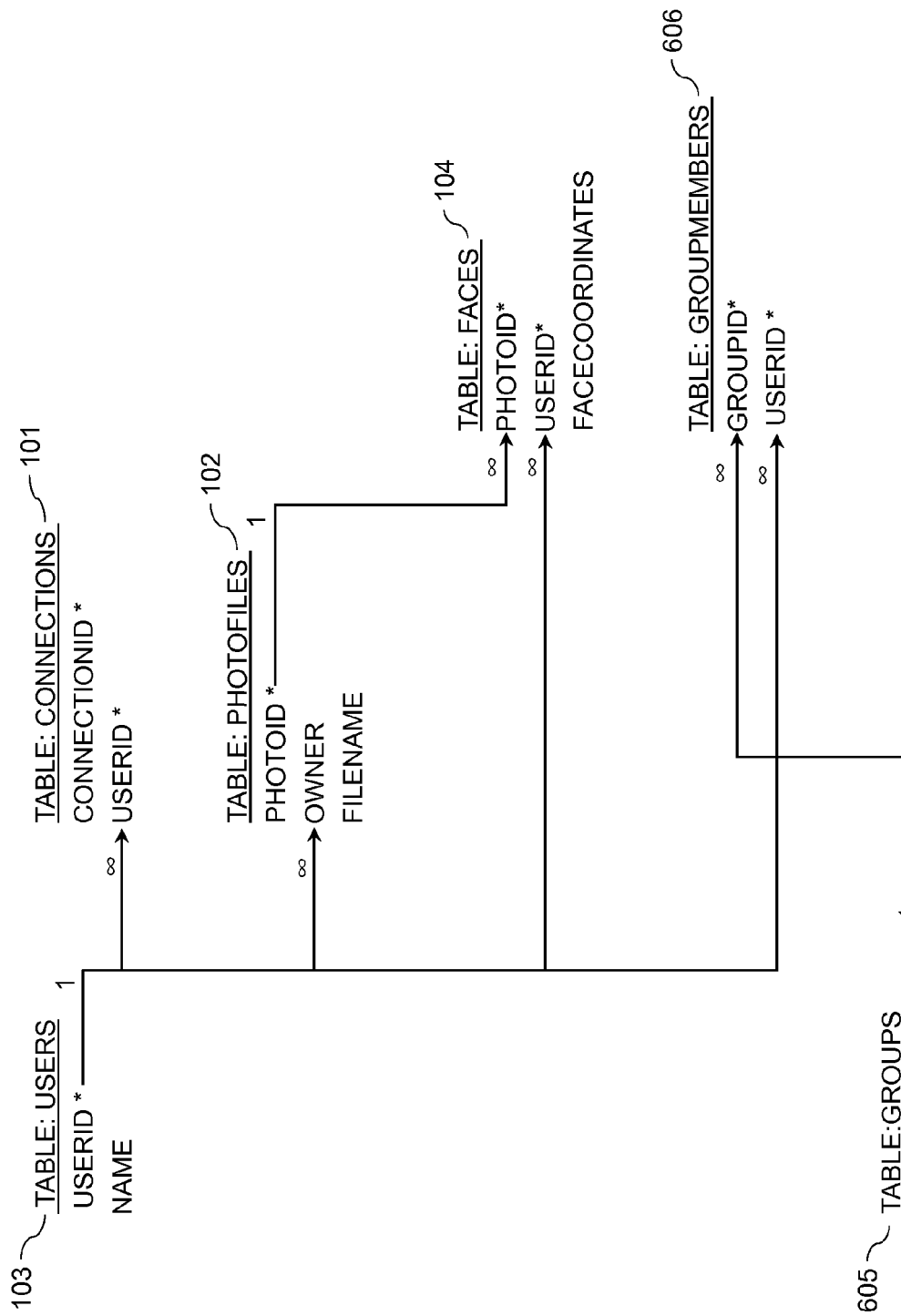
FIG. 7B illustrates the relational structure between the database tables of FIG. 2A and FIG. 7A.

Turning now to FIG. 7A, a third embodiment of the present invention will be described. In this third embodiment, the photo-management service allows the user to join user groups by providing groups table 605 and group members table 606 in the database. Groups table 605 defines each group by associating a "GroupID" value and a group name specified by a "GroupName" field. GroupID serves as a primary key, as indicated by the "*" symbol. Group members table 606 associates the users with one or more groups where "GroupID" and "UserID" fields both serve as primary keys. FIG. 7A is populated with exemplary data which may be combined with the tables and exemplary data of FIG. 2A. Furthermore, the relationships between these tables is shown in FIG. 7B where the GroupID field in groups table 605 is related to the GroupID field in the group members table 606 in a 1-to-many relationship. Also the UserID field from users table 103 is related to the UserID field of group members table 606 in a 1-to-many relationship.

Multiple users which are associated with a group in the group members table 606 are herein referred to as having a "group connection" and are considered "group members" of that group. Group connections differ from the direct or indirect connections discussed above which are herein also referred to as "personal connections." Two users may have both a group connection and a personal connection. For example user01 and user02 have a group connection by way of the group with GroupID=1. User01, user02, user03 and user04 share a group connection by way of the group with GroupID=2. Similarly, user01 and user09 have a group connection by way of the group with GroupID=3.

Figure 8:
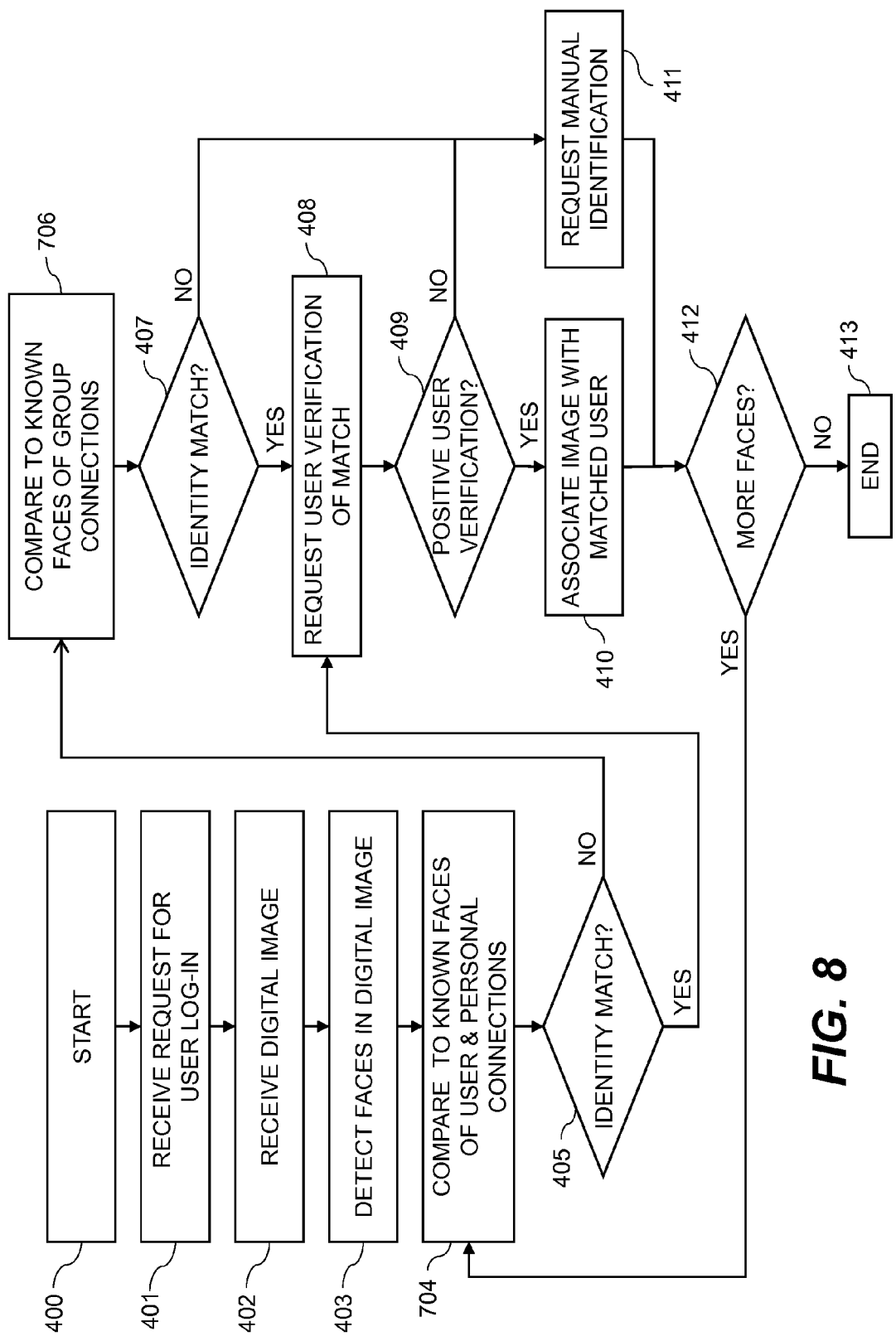
FIG. 8 is a flow chart describing a process for identifying people appearing in a user's digital images according to a third embodiment of the present invention.

Turning to FIG. 8 a process for use in this third embodiment will now be described. As was previously described with respect to the process shown in FIG. 5, this process may be implemented in software using any known logic-based programming language, or alternately in digital electronic hardware or a combination of digital electronic hardware and software. Similarly, it may be executed at the user's location on the user's access device, or at the photo-management service location, for example on the photo-management service's server.

Where steps share the same part numbers with those shown in FIG. 5, these steps are analogous to corresponding steps. Following the detect faces step 403, the process then continues with a compare to user and personal connections step 704 where the detected face in the received image is compared with faces that have been previously identified with the primary user and with faces identified with users who share personal connections (direct or indirect) to the primary user. This can be achieved by sequentially comparing the detected face to faces of the user and the user's first level connections followed by comparing to the user's second-level and more distant connections using multiple steps (not shown) similar to the process described above for the first embodiment shown in FIG. 5. Alternately, this can also be achieved by analyzing all connections of the primary user from the first level to the X level and generating a match using a connection level weighting factor as described above with respect to the second embodiment shown in FIG. 6.

Per decision block 405, if a match is identified, the process proceeds to the request user verification step 408. However, if no match is identified, the compare to group connections step 706 is executed where the detected face is compared with users sharing a group connection with the primary user as established by the group members table 606. The same facial comparison techniques that were previously described relative to the compare to user and direct connections step 404 can be applied here. The process then proceeds with decision block 407 which determines whether an identity match was found among the group connections. If an identify match has still not been made, the process proceeds to a request manual identification step 411 to request a manual identification. If an identity match has been found, the process proceeds to request user verification step 408 to request that the user verify the match.

Request user verification step 408, decision block 409, associate image with matched user step 410, request manual identification step 411, and decision block 412 may be performed in a similar fashion as was described relative to the first embodiment shown in FIG. 5.

Figure 9:
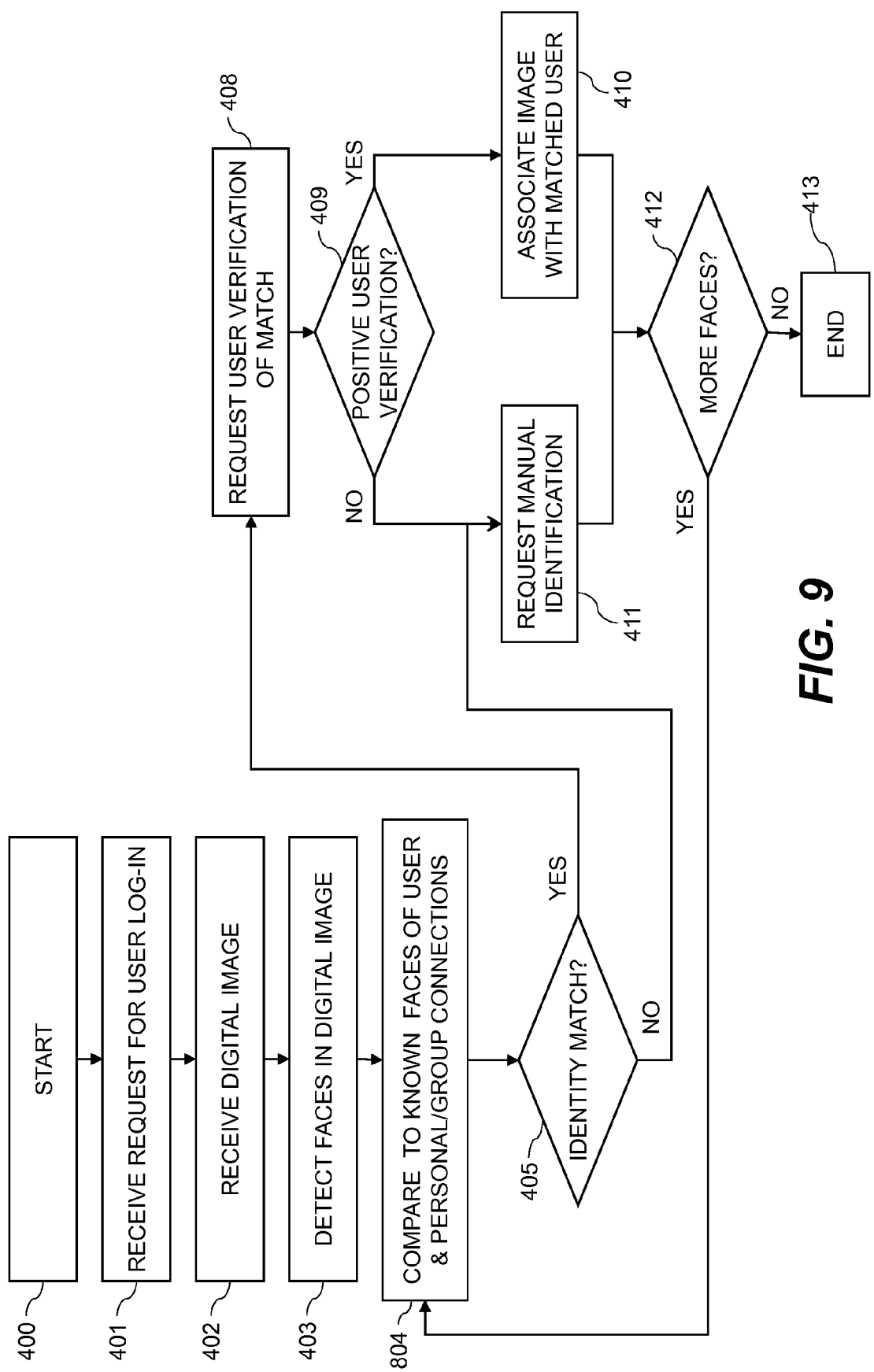
FIG. 9 is a flow chart describing a process for identifying people appearing in a user's digital images according to a fourth embodiment of the present invention.

Turning now to FIG. 9, a fourth embodiment of the present invention will be described. This fourth embodiment also uses the group connections described in the third embodiment of FIG. 8 and shown in the tables and exemplary data of FIG. 7A. As was previously described with respect to the process shown in FIG. 5, this process may be implemented in software using any known logic-based programming language, or alternately in digital electronic hardware or a combination of digital electronic hardware and software. Similarly, it may be executed at the user's location on the user's access device, or at the photo-management service location, for example on the photo-management service's server.

Where steps share the same part numbers with those shown in FIG. 5, these steps are analogous to corresponding steps. Following the detect faces step 403, the process then continues with a compare to user and personal/group connections step 804 where the detected face in the received image is compared with faces that have been previously identified with the primary user, with faces identified as users who are the primary user's personal connections (first-level connections through X level connections), and to users who are have a group connection to the primary user. In this embodiment, X is preferably second or third level connections, but may be also be set to a more distant level of connection such as fourth level, fifth level, or higher level.

A match score is then calculated using Eq. (1) or Eq. (2) for each of the compared users where the connection level weighting factor is adjusted for users which are group connection to the primary user. Some example values for the weighting factor L in Eq. (1) for a process where n=5 are:

L=0 for primary user and first-level personal connections
L=0.01 for second-level personal connections
L=0.02 for third-level personal connections
L=0.03 for fourth-level personal connections
L=0.04 for fifth-level and higher personal connections
L=0.04 for group connections Similarly, some example values for the weighting factor W in Eq. (2) for a process where n=5 are:

W=1.0 for primary user and first-level personal connections
W=0.98 for second-level personal connections
W=0.96 for third-level personal connections
W=0.94 for fourth-level personal connections
W=0.92 for fifth-level and higher personal connections
W=0.90 for group connections Alternately, the weighting factor L may vary depending on the number group members for a given group. Generally, it would be expected that the smaller the group, the more significant the connection would be. For example, a group containing members of a local club to which the user belongs would be more significant than a group containing fans of a popular sports team. In this case, the following values can be utilized for the weighting factor L in Eq. (1):

L=0.01 for group connections for groups having 2-10 group members
L=0.02 for group connections for groups having 11 to 50 group members
L=0.03 for group connections for groups having 31 to 100 group members
L=0.04 for group connections for groups having 101 or more group members.

It is possible that an individual has both a personal connection (direct or indirect) as well as a group connection to the primary user. In this case, a weighting factor L is calculated for the personal connection as well as for the group connection and the lower L value is used to calculate the match score. It is generally preferable that the lowest weighting factor L for a group connection is higher than the weighting factor L for the primary user and the primary user's direct connections. In this way, priority is given to users who have a direct personal connection to the primary user compared to users who only have a group connection to the primary user.

Similarly, some example values for the weighting factor W in Eq. (2) for group connections are:

W=0.98 for group connections for groups having 2-10 group members
W=0.96 for group connections for groups having 11 to 50 group members
W=0.94 for group connections for groups having 31 to 100 group members
W=0.92 for group connections for groups having 101 or more group members.

Figure 10:
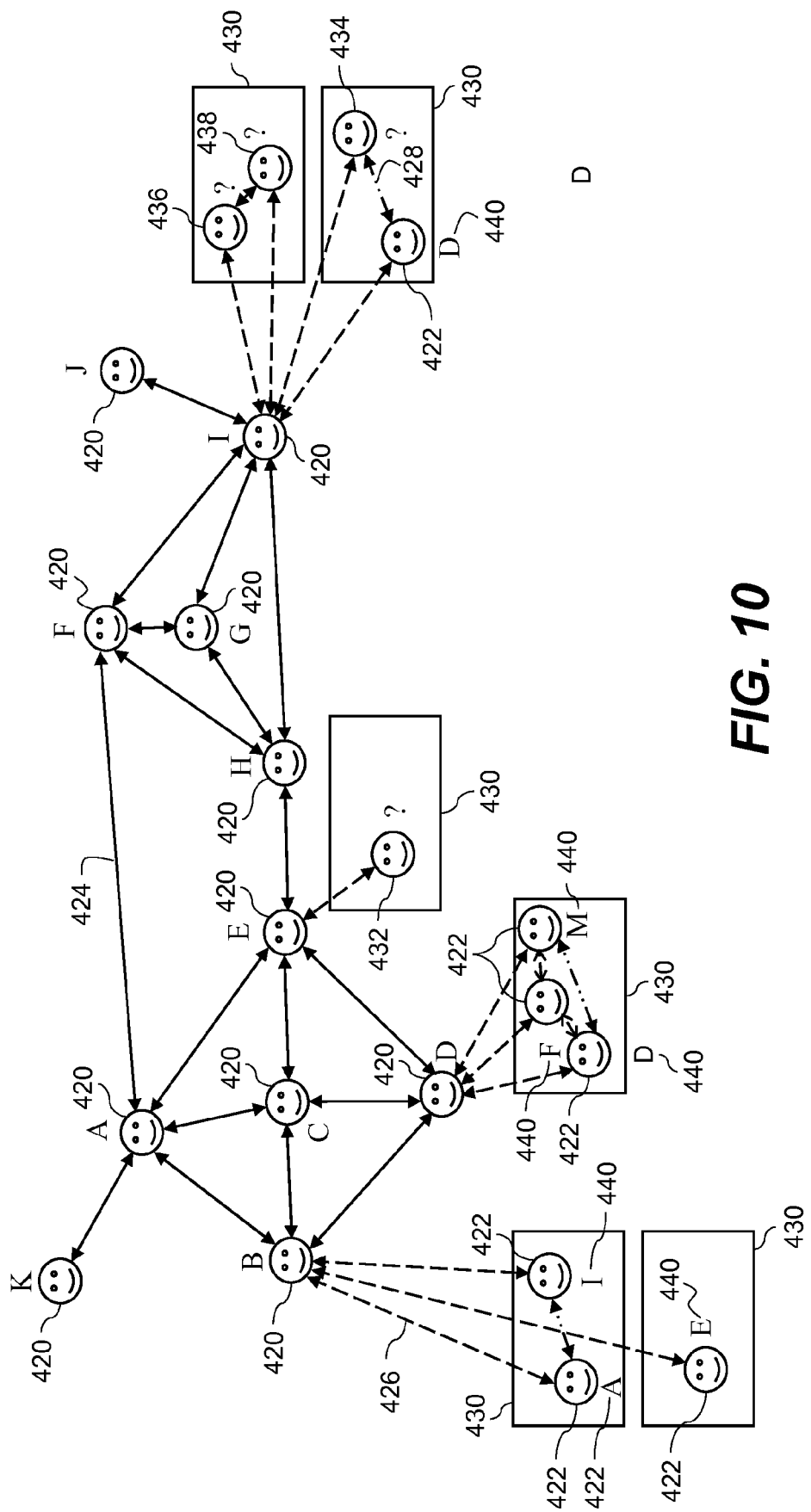
FIG. 10 is a graphic illustration showing a set of connected individuals and digital media assets used to describe an alternate embodiment of the present invention.

FIG. 10 is used to illustrate an alternative embodiment. The figure includes 11 different individuals 420 (A-K) having user accounts. There are also digital media assets 430 such as digital images, videos, and audio clips. The digital media assets 430 are associated with individual user accounts (for example, associative connection 426 links a digital media asset with user B.) The digital media assets contain persons 422 that are identified with labels 440. For example, user B has two associated digital media assets 430 (digital images). The first contains two persons 422 (A and I), and the second contains one person 422 (E). There are also digital media assets 430 that contain individuals that are have not been identified such as unidentified individuals 432, 434, 436, and 438. The task that the method solves is to identify the unidentified individuals 432, 434, 436, and 438 that have not been previously identified using appearance and information from the connections of the individual user accounts and digital media assets.

Notice that there are three types of connections shown in FIG. 10. First, there are friend connections 424 that directly connect user accounts. In some embodiments, these connections belong to one or more of several sub-categories, such as {relative, coworker, classmate, friend}. A second type of connection is an associative connection 426 which is a link indicating that a person (e.g. person B) has a connection with an indicated person in a digital media asset (such as people A, I and E in the case of the person B). The fact that the person has associated media assets containing specific individuals shows a social connection between them. A third type of connection is an image connection 428 which is a link indicating that two people appear together in a digital media asset, such as the people A and I in a digital media asset 430 that belongs to individual B. Note that people that appear in digital media assets 430 do not necessarily have an individual user account (e.g. person M).

The illustration in FIG. 10 can be used to define a connection graph G over the individuals in the user accounts and identified in the digital media assets. Then, based on G, an estimate of the likelihood that an unidentified individual (432, 434, 436, 438) in a digital media asset is a previously identified person is established. This estimate can be written is a probabilistic fashion as $P(p=n|G)$, i.e. the probably that unidentified person p has identity n, given the connection graph G.

Overall, the system seeks to determine the identity of an unidentified individual (432, 434, 436, 438) based on both the appearance of the unknown individual and the connection graph G. Probabilistically, the joint distribution between identity, appearance and the graph is written: P(p=n, G, A) the probability that unidentified person p has identity n, given the graph of connections G and appearance A. Under the Naïve Bayes assumption of conditional independence, this can be written:

$$P(p = n, G, A) = cP(A \mid p = n)P(G \mid p = n)P(p = n) \quad (3)$$

$$= cP(p = n \mid A)\frac{p(A)}{P(p = n)}P(p = n \mid G)\frac{p(G)}{P(p = n)}P(p = n)$$

where c is a constant, P(p=n|A) is the probability that an unknown person p has identity n (of a previously identified person) given appearance A, P(p=n|G) is the probability that unknown person p has identity n given the graph G.

The appearance based term P(p=n|A) is determined with a face recognition classifier. The appearance based term indicates the likelihood that an unknown person is a previously labeled person, based on appearance alone. Face recognition is well known in the art. Recognizing people based on their appearance is well known to one skilled in the art. Appearance features can be facial features using an Active Shape Model (T. Cootes, C. Taylor, D. Cooper, and J. Graham, "Active shape models-their training and application," Computer Vision and Image Understanding, Vol. 61, pp. 38-59, 1995.) Alternatively, appearance features for recognizing people are preferably Fisherfaces (see: P. N. Belhumeur, J. Hespanha, and D. J. Kriegman, "Eigenfaces vs. fisherfaces: Recognition using class specific linear projection," IEEE Transactions on Pattern Analysis and Machine Intelligence, Vol. 19, pp. 711-720, 1997). In this case, each face is normalized in scale (49×61 pixels) and projected onto a set of Fisherfaces, then classifiers (e.g. nearest neighbor with a distance measure of mean square difference) are used to determine the identity of an unidentified person in a digital media asset 430. In some embodiments, a face recognition score for an unidentified individual (e.g., 432, 434, 436, 438), is produced for each (or a subset of) the previously identified faces among the digital media assets.

The graph based term P(p=n|G) is determined via graph analysis. This term indicates the likelihood that an unknown person is a previously labeled person or a user with an account, based on the graph alone. For example, for unidentified individual 432, an evaluation of P(p=n|G) indicates how likely it is for unidentified individual 432 to be any of the people in the graph G. The intuition is that the unidentified individual 432 is more likely to be a person closer in the graph G than a person farther in the graph G. For example, the unidentified individual 432 is more likely to be individuals A, C, D or H than, for example individuals K or J because A, C, D and H are all closer in the graph than K or J. All types of connections contribute to the calculation of P(p=n|G). For example, individual B has a direct associative connection with person E, (due to E appearing in an image of B's), and so has a higher likelihood of appearing in E's collection of digital media assets than, say, person F (although neither B nor F are directly connected to person E via a direct friend connection between user accounts).

The graph G is defined over all the connections in the network. For example, FIG. 10 contains 12 individuals (A, B, C, D, E, F, G, H, I, J, K and M). The graph G is represented as a 12×12 matrix where nonzero entries indicate graph edges. A graph is a set of vertices (in our case, the individuals) and a set of pairs of vertices (in our case, the connections between individuals or identified individuals in digital media assets). The values of the nonzero entries indicate the weights of the graph edges (i.e. the strength of connections). The values in the matrix can be calculated using:

$$G(x, y) = \prod_{i \in B} d_i(x, y) \quad (4)$$

where $d_i(x,y)$ is a value related to the presence of a connection. The indicator i represents the type of friend connection (when i=1, the connection is a friend connection, when i=2, the connection is an associate connection, and when i=3 the connection is an image connection.) The set B is the set of indices such that $d_i(x,y)$ is nonzero. Thus, the weight G(x,y) is the product of the weights of all the existing connections between person x and person y. For example, $d_1(x,y)$ can be set to 0.5 if individuals x and y have a direct friend connection 424 between user accounts, and can be set to 0 otherwise. Note that in some embodiments, the weight for a direct connection varies based on the connection type (e.g., relative, coworker, classmate, friend). Similarly, $d_2(x,y)$ can be set to 0.75 if individuals x and y have an associative connection 426 between a user account and a digital media asset and 0 otherwise, and $d_3(x,y)$ can be set to 0.67 if individuals x and y have an image connection 428 within a digital media asset. Note that other connections can also contribute to weights in the graph between individuals. For example, membership in common or related groups, or similarity in interests between two people indicates some likelihood that these people will become or are acquainted.

The graph based term P(p=n|G) is a function of the graph G. In the preferred embodiment, P(p=n|G) is a function f( ) of features extracted from the graph G so that P(p=n|G)=f($G_F$), where $G_F$ are featured extracted from the graph. In one embodiment, the feature vector is the length of the shortest path (the path with the smallest sum) between the unidentified person and others. For example, in FIG. 10, the weights to other people based on the shortest path from the owner of the digital media asset E containing the unidentified individual 432 to each of the others is: $G_F$=[0.5, 0.75, 0.5, 0.5, 0.0, 1.0, 1.0, 0.5, 1.0, 1.5, 1.0, 1.0] corresponding to the individuals (A, B, C, D, E, F, G, H, I, J, K, M). This feature is based on the idea of finding the distance between individuals in the graph that represents the social network. Note there are more than two weights possible for the candidate individuals. Using a learning algorithm such as a support vector machine, the relationship between a probability and the feature $G_F$ is learned using training data (i.e. labeled data from social network) using methods well known in the art. It can be seen that this approach has the desired affect that a higher preference is given to persons who are directly connected to the owner of the digital media asset than to persons who are indirectly connected to the owner of the digital media asset.

In other methods, the features are based on a set of paths between identified individuals and the owner E of the digital media asset containing the unidentified individual 432. For example, considering only the direct connections between user accounts, there are 3 paths of length 2 (in the nonweighted version of the graph G) between B and E (B-A-E, B-C-E, B-D-E) but only one path of length 2 between individuals E and G (G-H-E). Therefore, it is more likely that unidentified individual 432 is B than G. One feature is the number of paths between the unidentified face and a previously identified individual that have a length less than a threshold T (e.g. 3).

The features and function f( ) can be based on models such as modeling the network shown in FIG. 10 as a resistor network of a DC circuit with each connection having a certain resistance (that can be learned from training data to facilitate to correct recognition of unidentified faces). Further, clustering analysis can be performed on the graph G to generate a list of likely candidate individuals.

Further, the graph can be thought of as representing a flow network and the feature can be the amount of flow passing through a given node (i.e., individual in the network) when the flow source is the unidentified individual. Algorithms to analyze the flow in a network are well known in the art, such as min-cut maxflow algorithms.

The graph analysis for finding graph based term $P(p=n|G)$ also serves the purpose that it limits the number of candidate individuals for applying the appearance based face recognition to, thereby limiting the computational complexity when there are thousands of millions of individuals in the graph G. In this embodiment, a list of candidates is identified using $P(p=n|G)$ as the set of individuals having high likelihood for being the unidentified person, then the face recognition based on appearance using previously identified faces is applied only for recognizing or matching whether the unidentified individual is among the list of candidate individuals.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

10 Network server
12 Communications network
14 Processor
16 Network interface unit
18 Database system
20 Non-volatile memory system
22 Volatile memory system
30 User access device
32 Processor
34 Non-volatile memory system
34 Volatile memory system
38 Network interface unit
40 Input device
42 Display device
44 Image sensing unit
50 Photo-management service
101 Connections table
102 Photo files table
103 Users table
104 Faces table
200 Hierarchical connection structure
300 Digital image
301 Individual
302 Individual
303 Individual
304 Rectangular region
305 Rectangular region
400 Start step
401 Receive request for user log-in step
402 Receive digital image step
403 Detect faces step
404 Compare to user and direct connections step
405 Decision block
406 Compare to indirect connections step
407 Decision block
408 Request user verification step
409 Decision block
410 Associate image with matched user step
411 Request manual identification step
412 Decision block
413 End step
420 Individuals
422 Persons
424 Friend connection
426 Associative connection
428 Image connection
430 Digital media assets
432 Unidentified individual
434 Unidentified individual
436 Unidentified individual
438 Unidentified individual
440 Labels
504 Compare to user and connections step
605 Groups table
606 Group members table
704 Compare to user and personal connections step
706 Compare to group connections step
804 Compare to user and personal/group connections step

What is claimed is:

1. A method for automatically identifying persons in digital media assets associated with a database of individual user accounts, comprising:

providing access to the database of individual user accounts, wherein the database includes connections between the individual user accounts;

designating a collection of digital media assets, wherein each digital media asset is associated with one or more of the individual user accounts and wherein one or more of the digital media assets have been tagged with the identity of one or more previously identified persons;

receiving a digital media asset associated with a first individual user account;

analyzing the received digital media asset to detect an unidentified person contained in the received digital media asset;

extracting appearance features for the unidentified person;

using the database of individual user accounts to produce a list of candidate individuals corresponding to previously identified persons;

determining weights for each candidate individual in the list of candidate individuals responsive to a connection path between the candidate individual and the first individual user account, wherein the weights can take on any of three or more possible values corresponding to three or more different connection paths;

using a processor to perform an identification process to identify the detected unidentified person from the list of candidate individuals responsive to trained person identifiers for the candidate individuals, the extracted appearance features, and the determined weights;

associating metadata with the received digital media asset providing an indication of the identity of the detected unidentified person.

2. The method of claim 1 wherein the previously identified persons were identified by an individual tagging a particular digital media asset with the identity of persons contained in the particular digital media asset.

3. The method of claim 2 wherein the individual further tagged the particular digital media asset with a bounding box identifying the location of the previously identified persons within the particular digital media asset.

4. The method of claim 1 further including the step of querying an owner of the first individual user account to verify the identity of the one or more identified persons.

5. The method of claim 1 wherein the received digital media asset is a digital image or a digital video.

6. The method of claim 1 wherein the database of individual user accounts is an on-line social network, each individual user account having an associated internet site that is linked to internet sites for other individual user accounts.

7. The method of claim 6 wherein the collections of digital media assets are media assets that have been uploaded by the owners of the individual user accounts to their respective interne sites.

8. The method of claim 1 wherein the identification process includes:
    determining match scores between the detected unidentified person and the previously identified persons;
    determining weighted match scores by applying the weights to the match scores to determined weighted match scores; and
    identifying the detected unidentified person to be the previously identified person corresponding to the largest weighted match score.

9. The method of claim 8 wherein some of the connection paths are personal connection paths and others of the connection paths are group connection paths, and wherein higher weights are assigned for candidate individuals having personal connection paths than for for candidate individuals having group connection paths.

10. The method of claim 1 wherein notification is provided to the one or more identified persons that they have been identified in the received digital media asset.

11. The method of claim 1 wherein the one or more identified persons are given the opportunity to verify that they were correctly identified.

12. The method of claim 1 wherein the one or more identified persons are given the opportunity to request that metadata providing an indication of their identity not be associated with the received digital media asset.

13. The method of claim 1 wherein the person identifiers include determining ratios of distances between facial features.

14. The method of claim 13 wherein the person identifier for a particular previously identified person is trained by determining characteristic ratios of distances between facial features from one or more images containing the particular previously identified persons.

15. The method of claim 1 wherein the weights are responsive to a connection distance associated with the connection paths.

16. The method of claim 15 wherein the weights include a first weight corresponding to a direct connection, a second weight corresponding to a first indirect connection, and a third weight corresponding to a second indirect connection having a connection distance larger than the first indirect connection.

17. The method of claim 15 wherein the weights provide a higher preference for candidate individuals having a smaller connection distance.

18. The method of claim 1 wherein the weights are responsive to connection types associated with the connection paths.

19. A method for identifying person in a digital image comprising steps of;
    providing access to a database of individual user accounts associated with a plurality of individual users including a first user account associated with a first user;
    providing one or more connections between the first user account and one or more second user accounts;
    providing one or more connections between the one or more second user accounts and one or more third user accounts, the third user accounts being different than any of the first or second user accounts;
    designating collections of digital media assets associated with the individual user accounts, wherein the collections of digital media assets include digital media assets containing previously identified persons, and wherein at least some of the previously identified persons are associated with corresponding individual user accounts;
    receiving a first digital media asset from the first user account including an unidentified person;
    using a processor to compare the unidentified person to the previously identified persons corresponding to the second user accounts determine an identity match;
    using a processor to compare the unidentified person to the previously identified persons corresponding to the third user accounts determine an identity match if an identity match with the previously identified persons corresponding to the second user accounts was not found; and
    associating the first digital media asset with an individual user account associated with the identity match.

20. A method for identifying an individual in a digital image comprising the steps of;
    providing access to a database of individual user accounts associated with a plurality of individual users including a first user account associated with a first user;
    providing one or more connections between the first user account and one or more second user accounts;
    providing a plurality of user groups, each user group being associated with a plurality of user accounts;
    identifying one or more third user accounts associated with user groups to which the first user account is associated;
    designating collections of digital media assets associated with the individual user accounts, wherein the collections of digital media assets include digital media assets containing previously identified persons, and wherein at least some of the previously identified persons are associated with corresponding individual user accounts;
    receiving a first digital media asset from the first user account including an unidentified person;
    using a processor to compare the unidentified person to the previously identified persons corresponding to the second user accounts determine an identity match;
    using a processor to compare the unidentified person to the previously identified persons corresponding to the third user accounts determine an identity match if an identity match with the previously identified persons corresponding to the second user accounts was not found; and
    associating the first digital media asset with an individual user account associated with the identity match.

* * * * *